United States Patent [19]

Younes

[11] 4,369,260

[45] Jan. 18, 1983

[54] PHOSPHORUS-CONTAINING ALTERNATING COPOLYMERS

[75] Inventor: Usama E. Younes, West Chester, Pa.

[73] Assignee: Atlantic Richfield Company, Los Angeles, Calif.

[21] Appl. No.: 255,511

[22] Filed: Apr. 20, 1981

[51] Int. Cl.[3] ................... C08F 297/02; C08F 297/04
[52] U.S. Cl. ................................ 521/189; 521/907; 525/91; 525/209; 525/329.1; 525/330.4; 525/340; 525/331.6; 525/333.3; 525/332.3
[58] Field of Search ............... 525/340, 329, 330, 334, 525/335, 336, 209; 521/189, 907

[56] References Cited

U.S. PATENT DOCUMENTS 3,906,057  9/1975  Durst .............................. 260/876 B
3,907,929  9/1975  Durst .............................. 260/876 B

FOREIGN PATENT DOCUMENTS 2251567  6/1975  France .
2367098  5/1978  France .

*Primary Examiner*—Stanford M. Levin
*Attorney, Agent, or Firm*—Dennis M. Kozak

[57] ABSTRACT

Copolymers having a backbone of alternating polymer blocks and phosphorus units and their method of production are disclosed. These alternating copolymers exhibit excellent fire retardancy.

9 Claims, No Drawings

PHOSPHORUS-CONTAINING ALTERNATING COPOLYMERS

The invention relates to phosphorus-containing copolymers.

More specifically, the invention relates to alternating copolymers produced by introducing phosphorus units into polymer backbones. The resulting copolymers have been found to be fire retardant.

Industry is continually searching for ways to impart fire-retardant properties to polymers such as polystyrene. The present invention furthers this search by providing a novel fire-retardant alternating copolymer.

According to this invention, there is provided an alternating copolymer having the formula:

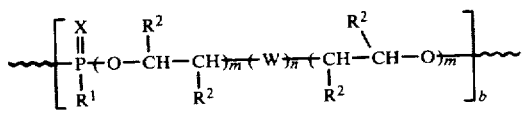

wherein $R^1$ represents a halogen, a ($C_1$ to $C_{10}$) alkyl or halogenated ($C_1$ to $C_{10}$) alkyl group, hydroxy, a ($C_1$ to $C_{10}$) alkoxy or halogenated ($C_1$ to $C_{10}$) alkoxy group, an aryl or halogenated aryl group, and an aryloxy or halogenated aryloxy group; X may or may not be present and represents oxygen or sulfur; W represents at least one monomer selected from the group consisting of dienes, styrenes, vinylidene chloride, vinyl esters, acrylic and methacrylic esters, and acrylonitrile; each $R^2$ separately represents hydrogen, a ($C_1$ to $C_4$) alkyl group, or an aryl group; n represents an integer equal to or greater than 2; each m separately represents an integer from 1 to 20, and b represents an integer from 2 to 1000.

Also, according to this invention, there is provided a method for producing the above-described alternating polymer which comprises forming a living polymer dianion by anionic polymerization, using an anionic polymerization initiator, of at least one monomer selected from the group consisting of dienes, styrenes, vinylidene chloride, vinyl esters, acrylic and methacrylic esters, and acrylonitrile; reacting the resulting living polymer dianion with a monoepoxide to produce a living polymer dioxyanion; and, reacting the living polymer dioxyanion with a phosphorus compound having the formula:

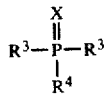

wherein X is as defined above, each $R^3$ separately represents a halogen and $R^4$ represents a halogen, a ($C_1$ to $C_{10}$) alkyl group, a ($C_1$ to $C_{10}$) alkoxy group, an aryl group and an aryloxy group.

Representative of the above phosphoros compounds and particularly suitable for use are: phosphorus(III) chloride, phosphorus(III) bromide, phosphorus(III) iodide, phosphorus(V) tribromide oxide, thiophosphoryl bromide, methyldichlorophosphine, methylphosphonic dichloride, methylphosphorodichloridite, methylphosphorodichloridiate, phosphorusoxychloride, methylphosphonothioic dichloride, methylphonic difluoride, ethyldichlorphosphine, ethylphosphonic dichloride, ethylphosphorodichloridite, i-propylphosphonic dichloride, n-propylphosphonic dichloride, n-propylphosphorodichloridite, t-butyldichlorophosphine, n-butylphosphonic dichloride, s-butylphosphonic dichloride, n-butylphosphorodichloridite, n-butylphosphorodichloridate, dibromophenylphosphine, dichlorophenylphosphine, phenylphosphonic dichloride, phenylphosphonothioic dichloride, cyclohexyldichlorophosphine, cyclohexylphosphonic dichloride, ethyldichlorothiophosphate, etc. and the like.

The living polymer dianion can be prepared using any suitable anionic polymerization initiator. Suitable initiators are well known and include the difunctional lithium catalysts designated "DiLi" by Lithium Corporation of America, the dialkali metal reagents (such as, for example, the dipotassium salt) of α-methyl styrene tetramer, and the well-known lithium-napthalene initiator, employed in the examples of this invention.

In the preparation of the alternating copolymers of this invention, any monomer (W) or monomer mixture which can be anionically polymerized can be employed. Monomers which can be anionically polymerized are dienes, styrenes, vinylidene chloride, vinyl esters, acrylic and methacrylic esters and acrylonitrile. As used herein, the term "styrenes" is understood to mean styrene, styrenes which are alkylated in the side chain such as α-methyl styrene and nuclear-substituted styrenes such as, vinyl toluene, t-butylstyrene and ethylvinyl benzene. Styrene monomers are preferred and styrene was employed in the examples of this invention. Example I below demonstrates the preparation of an alternating copolymer of this invention using a monomer mixture of styrene and butadiene.

In the practice of this invention, any suitable monoepoxide can be employed. Suitable monoepoxides include propylene oxide, ethylene oxide, styrene oxide and the like.

The copolymers of this invention may be straight chain, branched or cross-linked depending upon the constituents on the particular phosphorus compound selected and the ratios of reactants employed. For example, if the phosphorus compound contains more than two displaceable halogen groups the amount of branching can be controlled stoichiometrically.

The polymerization reaction is conducted in any suitable inert hydrocarbon or polar solvent such as cyclohexane, tetrahydrofuran, toluene, mixtures thereof, and the like. The polymerization reaction should also be conducted in the absence of oxygen, moisture, carbon dioxide and any other impurity which is detrimental to anionic catalyst systems. The temperature of polymerization may be from about −80° C. to about 120° C., depending upon the freezing point of the solvent employed.

The following examples further demonstrate the preparation of alternating copolymers of this invention.

EXAMPLE I

A one gallon stirred first reactor was charged with 1100 ml of cyclohexane and heated to 35° C.

The reactor contents were sterilized by the addition of sufficient lithium-napthalene initiator to turn the reactor contents dark green.

About 33 ml of a 1.5 N lithium-napthalene initiator and about 129.6 grams of styrene monomer were charged into the first reactor and the polymerization reaction allowed to proceed for about 30 minutes.

To the resulting polystyryl lithium dianion was added about 6.8 grams of butadiene. The polystyryl lithium dianion and the butadiene were reacted over a period of about 30 minutes resulting in the formation of a triblock polymer having a butadienyl lithium anion on each end. The number average molecular weight of the triblock polymer was calculated to be 5,500.

About 1.7 grams of propylene oxide were added to the first reactor contents and the contents stirred for about 30 minutes, until the contents turned white, indicating the conversion of the butadienyl lithium anions to oxyanions.

To a second reactor were introduced about 1 ml of phosphorus oxychloride ($POCl_3$) and 550 ml of the contents (dioxy terminated for block polymer) of the first reactor. The condensation reaction between the phosphorus oxychloride and the dioxy terminated triblock polymer was allowed to proceed for about 30 minutes and the system was terminated by the addition of about 5 ml of methanol.

The resulting alternating copolymer was recovered by precipitation from isopropyl alcohol, and filtered, washed with methanol and dried under vacuum.

The alternating copolymer was found to have a number average molecular weight of 22,700, a weight average molecular weight of 97,130, a Z average molecular weight of 301,600 and a polydispersity of 4.3, as measured by a gel permeation chromatograph using polystyrene standards. The percent phosphorus content of the copolymer was calculated to be 0.54. The oxygen index was determined to be 33, using substantially the procedure entitled "Oxygen Index of Liquids" by Nelson and Webb, *Journal of Fire and Flamability*, Volume 4, p. 210, 1973. The test procedure is taught to be suitable for use on fusible solids as well as liquids.

EXAMPLE II

A one gallon stirred reactor was charged with 2200 ml cyclohexane, 100 ml tetrahydrofuran and heated to 45° C.

The reactor contents were sterilized by the addition of sufficient lithium-napthalene initiator to turn the reactor contents dark green.

About 52.5 ml of a 2.07 N lithium-napthalene initiator and about 300 ml of styrene monomer were charged into the reactor and the reaction to form a polystyryl lithium dianion was allowed to proceed for about 35 minutes.

About 22.0 ml of propylene oxide were added to the reactor contents and the contents stirred for about 45 minutes to convert the polystyryl lithium anions to oxyanions.

About 5.2 ml of $PBr_3$ were added to the contents of the reactor and the condensation reaction between the $PBr_3$ and the polystyryl lithium dioxyanion was allowed to proceed for about 40 minutes. And, the system was terminated by the addition of about 5 ml of methanol.

The resulting alternating copolymer was recovered by precipitation from isopropyl alcohol, and filtered, washed with methanol and dried under vacuum.

The resulting alternating copolymer was found to have a number average molecular weight range of from about 2,500 to about 5,260,000 with a maximum peak of about 31,000 as measured by a gel permeation chromatography using polystyrene standards. The percent phosphorus content in the copolymer was calculated to be about 0.6. The oxygen index was determined, using the procedure described above, to be 31.

EXAMPLE III

A one gallon stirred reactor was charged with 2200 ml of cyclohexane and heated to 40° C.

The reactor contents were sterilized by the addition of sufficient lithium-napthalene initiator to turn the reactor contents dark green.

About 68 ml of a 1.5 N lithium-napthalene initiator and about 300 ml of styrene monomer were charged into the first reactor and the reaction to form a polystyryl lithium dianion allowed to proceed for about 30 minutes.

To the reactor contents (polystyryl lithium dianion) was added about 30 ml of propylene oxide and the contents stirred for about 30 minutes to convert the anions to oxyanions.

The resulting polystyryl lithium dioxyanion was found to have a number average molecular weight of 8500 as measured by a gel permeation chromatograph.

About 4.9 ml of $PBr_3$ were added to the contents of the reactor and the condensation reaction between the $PBr_3$ and the living polymer was allowed to proceed for about 30 minutes. And, the system was terminated by the addition of about 5 ml of methanol.

The resulting alternating copolymer was recovered by precipitation from isopropyl alcohol, and filtered, washed with methanol and dried under vacuum.

The alternating copolymer was found to have a number average molecular weight of 24,200; a weight average molecular weight of 129,400, a Z average molecular weight of 710,600 and a poly dispersity of 5.3 as measured by a gel permeation chromatograph using polystyrene standards. The percent phosphorus content of the copolymer was calculated to be 0.55. The oxygen index was determined, using the procedure described above, to be 26.

It is apparent from the foregoing that the copolymers of this invention provide excellent fire retardancy when compared, for example, to polystyrene which when tested using the same procedure exhibited an oxygen index of 18. As such, the copolymers of this invention will serve to impart fire retardancy to various products conventionally manufactured from polymers such as films, sheets, foams, molded articles, coatings, fibers and the like. In one preferred use, the alternating copolymers of this invention are employed as compatible, fire-retardant additives for polymers and serve to provide a marked improvement in the fire retardant properties of the resulting polymers or polymer blends.

It will be evident from the foregoing that various modifications can be made to the present invention. Such, however, are considered as being within the scope of the invention.

What is claimed is:

1. An alternating copolymer having the formula:

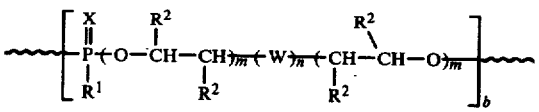

wherein $R^1$ represents a halogen, a ($C_1$ to $C_{10}$) alkyl or halogenated ($C_1$ to $C_{10}$) alkyl group, hydroxy, a ($C_1$ to $C_{10}$) alkoxy or halogenated ($C_1$ to $C_{10}$) alkoxy group, an aryl or halogenated aryl group, and an aryloxy or halogenated aryloxy group; X may or may not be present and represents oxygen or sulfur; W represents at least one monomer selected from the group consisting of dienes, styrenes, vinylidene chloride, vinyl esters, acrylic and methacrylic esters, and acrylonitrile; each $R^2$ separately represents hydrogen, a ($C_1$ to $C_4$) alkyl group, or an aryl group; n represents an integer equal to or greater than 2; each m separately represents an integer from 1 to 20, and b represents an integer from 2 to 1000.

2. A method for producing the alternating copolymer of claim 1 which comprises forming a living polymer dianion by anionic polymerization, using an anionic polymerization initiator, of at least one monomer selected from the group consisting of dienes, styrenes, vinylidene chloride, vinyl esters, acrylic and methacrylic esters, and acrylonitrile; reacting the resulting living polymer dianion with a monoepoxide to produce a living polymer dioxyanion; and, reacting the living polymer dioxyanion with a phosphorus compound having the formula:

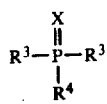

wherein X is as defined above, each $R^3$ separately represents a halogen, and $R^4$ represents a halogen, a ($C_1$ to $C_{10}$) alkyl group, a ($C_1$ to $C_{10}$) alkoxy group, an aryl group and an aryloxy group.

3. The alternating copolymer of claim 1 in the form of a film.

4. The alternating copolymer of claim 1 in the form of a molded article.

5. The alternating copolymer of claim 1 in the form of a fiber.

6. The alternating copolymer of claim 1 in the form of a coating.

7. The alternating copolymer of claim 1 in the form of a foam.

8. A polymer blend comprising the alternating copolymer of claim 1.

9. A fire retardant additive for polymers consisting essentially of the alternating copolymer of claim 1.

* * * * *